US 6,573,343 B1

United States Patent
Follestad

(12) United States Patent
(10) Patent No.: US 6,573,343 B1
(45) Date of Patent: Jun. 3, 2003

(54) MULTISTEP PROCESS FOR PREPARING POLYOLEFINS HAVING HIGH MELT STRENGTH

(75) Inventor: Arild Follestad, Stathelle (NO)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/868,253

(22) PCT Filed: Dec. 16, 1999

(86) PCT No.: PCT/GB99/04273

§ 371 (c)(1),
(2), (4) Date: Jun. 15, 2001

(87) PCT Pub. No.: WO00/35970

PCT Pub. Date: Jun. 22, 2000

(30) Foreign Application Priority Data

Dec. 16, 1998 (GB) .............................. 9827706
Dec. 17, 1998 (GB) .............................. 9827863

(51) Int. Cl.$^7$ .............................. C08F 4/642; C08F 4/69
(52) U.S. Cl. .............. 526/65; 526/66; 526/113; 526/114; 526/115; 526/116; 526/117; 526/118; 526/119; 526/905; 525/240
(58) Field of Search .............. 526/65, 66, 113, 526/114, 115, 116, 117, 118, 119, 905

(56) References Cited

U.S. PATENT DOCUMENTS

| 4,939,217 A | 7/1990 | Stricklen |
| 5,032,562 A | 7/1991 | Lo et al. |
| 5,032,651 A | 7/1991 | McDaniel et al. |
| 5,064,797 A | 11/1991 | Stricklen |
| 5,104,839 A | 4/1992 | McDaniel et al. |
| 5,395,810 A | 3/1995 | Shamshoum et al. |
| 5,399,540 A | 3/1995 | Kuo et al. |
| 5,525,678 A | 6/1996 | Mink et al. |
| 5,527,867 A | 6/1996 | Bergmeister |
| 5,543,376 A | 8/1996 | Bergmeister |
| 5,648,439 A | 7/1997 | Bergmeister et al. |

FOREIGN PATENT DOCUMENTS

| EP | 605 952 A2 * | 7/1994 |
| EP | 692498 | 1/1996 |
| EP | 0 770 629 | 5/1997 |
| EP | 0 881 237 | 12/1998 |
| WO | WO92/12182 | 7/1992 |
| WO | WO95/07942 | 3/1995 |
| WO | WO96/18662 | 6/1996 |
| WO | WO98/02247 | 1/1998 |
| WO | WO98/05422 | 2/1998 |
| WO | WO98/57998 | 12/1998 |
| WO | WO99/16797 | 4/1999 |

OTHER PUBLICATIONS

US 5,242,876, 9/1993, Shamshoum et al. (withdrawn)

* cited by examiner

Primary Examiner—David W. Wu
Assistant Examiner—R. Rabago
(74) Attorney, Agent, or Firm—Nixon & Vanderhye P.C.

(57) ABSTRACT

Olefin polymers are prepared in a plurality of polymerization stages, optionally in a plurality of polymerization reactors, in the presence of hydrogen and an olefin polymerization multisite catalyst, preferably a dualsite catalyst, having at least catalytic sites A and B, site A capable of yielding polymers of different molecular weights and differing $MFR_2$ or $MFR_{21}$ depending on the concentration of hydrogen in the polymerization reactor and site B capable of yielding polymers of certain molecular weight and $MFR_2$ or $MFR_{21}$ depending on the concentration of hydrogen in the polymerization reactor where the ratio between $MFR_2$ or $MFR_{21}$ of polymers produced by site B at two different selected hydrogen concentrations is less than ten and the ratio between $MFR_2$ or $MFR_{21}$ of polymers produced by site A at the same hydrogen concentrations is more than 50.

15 Claims, 4 Drawing Sheets

MULTISTEP PROCESS FOR PREPARING POLYOLEFINS HAVING HIGH MELT STRENGTH

This invention relates to a process of addition polymerization, especially olefin polymerization, and to a catalyst system therefor. In particular the invention relates to a multistage polymerization process effected using a multisite, preferably dual-site polymerization catalyst.

The molecular weight distribution (MWD) of a polymer affects the properties of the polymer, in particular its mechanical strength and processability. Long term mechanical strength to a large extent is determined by the high molecular weight fraction and extrudability to a large extent is determined by the low molecular weight fraction. The mechanical strength moreover can be manipulated by the inclusion of α-olefin comonomers, with it thus being possible to vary the nature and relative content of the side chains so introduced. This is particularly important for the high molecular weight portion of a broad MWD polymer, e.g. a PE polymer, and thus the comonomer content of the high molecular weight portion may typically be desired to be greater than that in the low molecular weight portion which latter may be a homopolymer. Accordingly polymers with a broad or multimodal (e.g. bimodal) MWD find many uses as for example in blow moulding, films, pipes, wire, cable, etc., where a combination of strength and extrudability is particularly important.

Certain olefin polymerization catalysts are generally less suitable for the single stage preparation of polymers for such uses because the MWD for the polymers they produce is too narrow and as a result the polymer may be difficult to process.

The preparation of broad MWD olefin polymers is described for example in EP-A-310734, EP-A-128045 and NO-923334.

Thus broad MWD olefins can be made in a dual reactor system (e.g. as described in NO-923334) using a variety of transition metal catalysts, e.g. Ziegler catalysts. The broad MWD results in this case from the process conditions in the different reactors favouring the production of different molecular weight polymers, e.g. one favouring the production of a higher molecular weight polymer and another favouring production of a lower molecular weight polymer.

Some catalysts in a single polymerisation stage, for example chromium oxide catalyst, inherently give broad MWD in a single polymerisation stage, however such catalysts in general tend to include alpha olefin comonomers in the low MW part, resulting in poorer mechanical properties.

Ideally, to achieve the most advantageous polymer properties in a multi-stage bimodal polymerisation process, an optimum polymer product would contain a very small amount of very high molecular weight polymer and a large amount of very low molecular weight polymer. However, such a polymer product has proved difficult to synthesize due to the formation of polymeric gels. These gels originate due to the difficulty of meltmixing particles of very different melt viscosities. The cause of the polymer particles arriving at the extrusion step having widely different melt viscosities is the broad residence time distributions of the polymerisation stages.

It is often a requirement that the melt strength of the polymer product is high (for example for blow moulding). However, though this requirement has been met in single stage polymerization using chromium oxide catalysts to give monomodal polymers, to achieve a high melt strength polymer from a staged polymerization, especially making a bimodal polymer, is still a problem.

We have now found that the MWD of a polyolefin can be particularly effectively tailored to suit the needs of the user of the polyolefin, e.g. the producer of blow moulded objects, films, cables, tubes and pipes, etc., if polymerization is effected in at least two reaction stages using a catalyst material, generally a particulate material, that contains at least two different types of active polymerization sites wherein one of the sites gives rise to polymers of differing molecular weights depending on the concentration of hydrogen in the reactor and the other site gives rise to polymers of substantially the same molecular weight irrespective of the hydrogen concentration. Typically such a catalyst material may contain a particulate multi-site component, optionally together with, in a liquid phase or not, co-catalysts and adjuvants.

BRIEF DESCRIPTION OF THE DRAWINGS

The invention is further described in the drawings in which.

Figure 1:
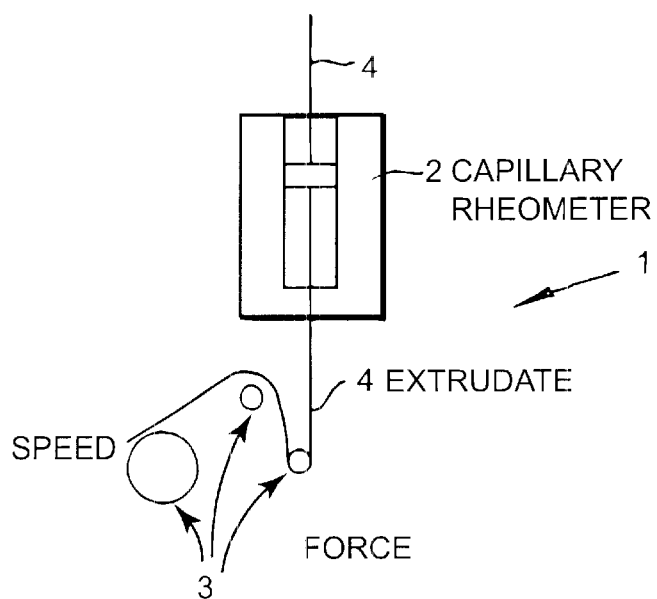
FIG. 1 is a schematic diagram of an apparatus for measuring melt strength.

It is envisaged that such a multi-stage, multi-site catalyst process will give rise to advantages over prior art processes. For example, by using a multistage polymerisation the make-up of the final composition may be tailored much more readily than in for example a single stage polymerisation, thus the process of the invention allows great flexibility.

One might envisage that hydrogen concentration could be made to fluctuate in one reactor to provide the desired broad MWD but there are also problems associated with the use of varying hydrogen pressures in a continous reaction. Molecular weight needs to fluctuate very quickly in comparison to the residence time of the reactor in order that the polymer produced gets a consistent average molecular weight. This is difficult and costly to achieve since hydrogen would need both to be removed and added rapidly during the course of the reaction.

Thus viewed from one aspect the invention provides a process for the preparation of an olefin polymer wherein olefin polymerization is effected in a plurality of polymerization stages (optionally in a plurality of polymerization reactors) in the presence of an olefin polymerization multisite catalyst, preferably a dualsite catalyst, having at least catalytic sites A and B, site A capable of yielding polymers of different molecular weights and differing $MFR_2$ or $MFR_{21}$ depending on the concentration of hydrogen in the polymerization reactor and site B capable of yielding polymers of certain molecular weight and $MFR_2$ or $MFR_{21}$ depending on the concentration of hydrogen in the polymerization reactor wherein the ratio between $MFR_2$ or $MFR_{21}$ of polymers produced by site B at two different selected hydrogen concentrations is less than 10, preferably less than 5 and most preferably less than 2 and the ratio between MFR$_2$ or MFR$_{21}$ of polymers produced by site A at the same hydrogen concentrations is more than 50, preferably more than 100, especially more than 1000.

The multisite catalyst for use in the process of the invention is preferably a mixture of catalytic precursors loaded onto a particulate support. The same support particles may carry both catalyst sites A and B, optionally together with a co-catalyst or activator. The different catalyst sites A and B may derive from the same catalyst types (e.g. Ziegler Natta, chromium, vanadium, metallocene, etc) or more preferably they may derive from different catalyst types, e.g. Ziegler Natta and metallocene, chromium and metallocene, etc. What is required is that they be selected according to their sensitivity to hydrogen concentration in terms of the MW of the polymer product they produce.

While catalyst sites A and B may be on different support particles, to reduce polymer gel formation in slurry or gas phase reactors it is important that they be present on the same particles.

It is preferred if Site A provides the polymer component of significantly differing molecular weight depending on the hydrogen concentration.

Also it is preferred if $$\frac{MW_{2A} \cdot MW_{1B}}{MW_{1A} \cdot MW_{2B}} < 0.5 \qquad (1)$$

preferably 0.3, most preferably 0.2. Here $MW_{1A}$ is the peak molecular weight of the polymer produced by site A, in the stage where site A gives the relatively higher MW; $MW_{2A}$ is the peak molecular weight of the polymer produced by site A in the stage where site A gives the relatively lower MW; $MW_{1B}$ is the peak molecular weight of the polymer produced by site B when A gives $MW_{1A}$; and $MW_{2B}$ is the peak molecular weight of the polymer produced by site B when A gives $MW_{2A}$.

Thus process of the invention ensures that the polymer produced by the B site is mixed into every polymer particle allowing optimum polymer properties such as reducing the amount of polymeric gel present after extrusion. The high MW polymer made by the A site may be prepared in for example either the first or the second reaction stage. The low MW component made by the A site may also be made in either first or second stage although preferably this low MW component is made in the first stage. It has surprisingly been found that it is advantageous to make the low MW polymer component produced by site A in the first stage since this would usually give higher production capacity than making this low MW component in the second stage. Often the production rate of a reactor is limited by the capacity of the cooling system that is removing the heat of polymerization. The capacity of the cooling system is increased when the polymerization temperature is increased, so usually reactors are operated as close to the maximum operating temperature as practically possible. The low MW component is usually preferably made as a homopolymer, and the high MW component is usually made as a copolymer. The lower the comonomer content of the polymer in a reactor, the higher the maximum operating temperature. So by making the low MW component in the first reactor the capacity of this reactor is increased.

This is advantageous because the invention enables production of the favourable polymer with an increased fraction of LMW polymer compared to staged polymerization with a one-site catalyst like the traditional Ziegler catalyst or a single site catalyst. Also, in a preferred option, site B would produce high MW polymer in the stage that site A produces low MW polymer. So in order to produce the required amount of low MW component, the LMW reactor (high hydrogen concentration reactor) must have sufficient capacity to also produce additional high MW polymer by site B, which is most easily achieved when the LMW reactor is the reactor that can be operated at the highest temperature.

It is preferred for the minor part of the final polymer product to be prepared by site B. The major part of the polymer is prepared by site A. The more constant MW fraction made by site B is preferably a higher MW fraction although it is envisaged that an intermediate or low MW fraction could also be the more constant MW fraction. The amount of more constant MW fraction may be in the range 1 to 50 wt %, preferably 2–30 wt %, most preferably 5–20 wt %.

The reactor used in one stage of the process may be used in a subsequent polymerization stage. Where the process of the invention is effected in a single reactor vessel, polymerization stages will conveniently be effected using different monomer/comonomer mixtures, hydrogen concentration and optionally different process conditions (ie. temperature, pressure, reaction time, etc.). However, employing sequenced polymerization in one reactor is less preferred than performing sequential polymerization in a series of reactors.

It is particularly preferred that no one of the reaction stages used in the process of the invention be used to produce more than 95% by weight of the overall polymer, more particularly no more than 90%, especially no more than 85%, more especially no more than 78% and most especially no more than 70%. The two reactor stages referred to (wherein one catalyst gives rise to polymers of different MW and the other gives rise to polymers of substantially constant MW) preferably together make at least 50% by weight, more preferably at least 80% by weight of the total polymer. Thus if a prepolymerization is effected to produce a catalyst-polymer material for use in the process of the invention, that process will generally involve the use of at least two more reaction stages, such stages producing more than 93% by weight, preferably more than 96% by weight, particularly preferably more than 98% by weight of the polymer material. In the absence of prepolymerization, the process of the invention will involve at least two reaction stages capable of producing up to and including 100% by weight of the polymer material. Preferably however, at least 10% by weight of the total polymer should be made in each of the stages considered.

Usually, for PE, staged reactors are used to produce polymers that consist of a fraction made in one reactor of about 40 wt % of a low MW polymer with little or low comonomer content, and made in another reactor about 60 wt % of a high MW copolymer with substantially higher comonomer content than that of the low MW fraction. The MFR$_2$ of the low MW fraction would be 100–400, the MFR$_{21}$ of the HMW fraction would be 0.4–1.5 and its MFR$_2$ 0.004–0.015. This composition would be close to the limit of what can be homogenised in an extruder. If the amount of low MW polymer had been substantially higher, compensated by an increase of the MW of the high MW fraction to keep MFR$_{21}$ of the final product constant, after the extrusion step after the polymerization stages, would be seen a most unfavourable increase of gels consisting of high MW regions.

According to the present invention, this is preferably provided a low MW fraction of 40–70 wt % (in the preferred option this would be the low MW fraction from site A), and a ratio between the MFR$_2$ of the low MW component and the high MW component of site A of 10000–2000000. The MFR$_2$ of the low MW fraction from site A is preferred to be 100–2000, and the MFR$_{21}$ of the high MW fraction of site A is preferred to be 0.05–1.0.

However, as this invention enables the mixing of the more difficult/extreme compositions, our invention is especially suited and more preferred for a ratio of 100000–2000000, a MFR$_2$ of the low MW fraction from site A of 500–2000, and a MFR$_{21}$ of the high MW fraction of site A of 0.05–0.4 and especially preferred for a ratio of 400000–2000000, a MFR$_2$ of the low MW site fraction from site A of 800–2000, and a MFR$_{21}$ of the high MW fraction of site A of 0.05–0.2.

Furthermore, it is especially preferred that at least two different reactants selected from monomer, comonomer and hydrogen be used in at least two of the reaction stages, hydrogen being present in at least one stage whereby at least one of the catalytic sites is caused to produce a different polymer in two different reaction stages and at least one of the catalytic sites is caused to produce a substantially similar polymer in two different reaction stages. In this way, the tailoring of the high molecular weight end of the molecular weight distribution discussed below can be achieved. It is also envisaged that a viable polymer product could be produced if the more constant MW component was only produced in one of the preferably two reaction stages and this forms a further aspect of the invention.

In each reaction stage, at least one of the different types of active polymerization sites on the catalyst material will generate a polymer of different molecular weight distribution, in other words the resulting polymer will be an intimately mixed polymer mixture, e.g. having a multimodal or broad molecular weight distribution or otherwise containing two intermingled populations of polymers with different properties. By using a multiplicity of polymerization reactors a control of a multimodal molecular weight distribution may be achieved using the process of the invention which cannot be achieved in a single reactor using a catalyst system even with four or more active polymerization sites.

The process of the invention involves effecting polymerization in a plurality of (ie. at least two) reaction stages. The reactors used may conveniently be any of the conventionally used polymerization reactors, e.g. reactors for solution polymerization, slurry tank or slurry loop polymerization or gas phase polymerization, etc. (Reduction of gel formation is important particularly in slurry or gas phase reactors—production of high melt strength polymers may be desirable in any of the conventional reactor systems.) The polymer product of an early stage (e.g. the first) may be passed on to the subsequent (e.g. second) reactor on a continuous, semi-continuous or batchwise basis. In a semi-continuous process, a batch of the reaction mixture is extracted from one reactor and passed to the next reactor at a regular interval which is less than the overall average residence time for the first reactor, e.g. batches may be removed every minute even though the overall residence time is one hour. Semi-continous and continous reactors are preferred over batchwise reactors. Each reactor will conveniently be provided with means for supplying monomer into the reactor and the overall multi-reactor structure will preferably be provided with means for recycling diluents, fluidizing gas or monomer into one or more of the individual reactors. The process of the invention will be a multistage polymerization process carried out in a single reactor or using a combination of two or more of the reactor types mentioned above, e.g. a combination of a loop and a gas-phase reactor such as that described in EP-A-517868 and WO 96/18662. Preferably the process of the invention should use only particle forming reactors such as slurry and gas phase reactors or solution phase reactors. The total number of reactors used will depend on the catalyst system used and the molecular weight distribution desired for the polymer end product. Typically 2 to 5, preferably 2 or 3, most preferably 2 main reactors will be used.

For slurry reactors, the reaction temperature will generally be in the range 60 to 110° C. (e.g. 85–110° C.), the reactor pressure will generally be in the range 5 to 80 bar (e.g. 25–65 bar), and the residence time will generally be in the range 0.3 to 5 hours (e.g. 0.5 to 2 hours). The diluent used will generally be an aliphatic hydrocarbon having a boiling point in the range −70 to +100° C. or the monomer itself . In such reactors, polymerization may if desired be effected under supercritical conditions, especially in loop reactors.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. If the gas phase reactor is not the first reactor to be used in the process, the residence time can be further decreased to 0.25 hours. The gas used will commonly be a non-reactive gas such as nitrogen together with monomer (e.g. ethylene or propylene).

For solution phase reactors, the reaction temperature used will generally be in the range 130 to 270° C., the reactor pressure will generally be in the range 20 to 400 bar and the residence time will generally be in the range 0.1 to 1 hour. The solvent used will commonly be a hydrocarbon with a boiling point in the range 80–200° C.

The invention is particularly well suited for employing in a process where the low MW component from site A is made in a first main reactor being a slurry loop with light diluent in sub- or supercritical condition, the slurry from this reactor being flashed to later enter a second main reactor being a fluidised gas phase reactor, in which the high MW component from site A is made. The special advantage using the invention in such a process has to do with a fluidised gas reactor requiring a relatively coarse polymer powder with low amount of fines for acceptable production performance, this is more easily supplied from the slurry loop by the present invention than by a corresponding one-site catalyst containing site A only.

In the process according to the invention hydrogen concentrations may be those conventionally employed in the art. These vary according to the catalyst type used in the polymerization process; thus for example to produce the low molecular weight polymer where catalyst site A is a Ziegler Natta catalyst then a higher hydrogen concentration would be required than where it is a chromocene on silica catalyst and in turn chromium/silica requires a higher hydrogen concentration than a metallocene catalyst. Generally the partial pressure ratio between hydrogen and monomer in the low MW production stage would be 0.000001 to 5 while in the high MW production stage it would be 0 to 0.1.

The process of the invention is for the polymerization of olefins, in particular alpha-olefins and mixtures thereof, e.g. $C_{2-10}$ α-olefins such as ethylene, propene, but-1-ene, n-hex-1-ene, 4-methyl-pent-1-ene, n-oct-1-ene, etc. The process is particularly effective for the preparation of polyethylene and polypropylene as well as copolymers of ethylene with one or more copolymerizable monomers, e.g. $C_{3-20}$ mono and dienes, styrene, and norbornene, more preferably $C_{3-10}$ α-olefin monomers and copolymers of propene with one or more copolymerizable monomers, e.g. $C_{4-20}$ mono and dienes, more preferably $C_{4-10}$ α-olefin monomers or ethylene.

Although it is envisaged that the molecular weight of the component changing molecular weight should be dictated by the hydrogen concentration it is envisaged that molecular weight could also be affected by the nature of the co-monomer. For example, it is known that for certain rare catalysts, molecular weight can be affected by adding butene or hexene to the polymerisation mixture. This forms a further aspect of the invention.

The process of the invention is particularly suited to producing polypropylene homopolymers, polypropylene random copolymers, the homopolymer component of a heterophasic copolymer which also include polymers with high ethylene content in the form of for example ethylene/propylene rubber or low density polyethylene.

Preferably the polymer product has ethylene as the major monomer, ie. at least 50% by number monomer residues being of ethylene, more preferably at least 50% by weight being ethylene residues.

As discussed above, the catalyst material thus conveniently comprises at least two different catalytic sites. These can be selected from all types of catalysts capable of olefin polymerization, e.g. Ziegler catalysts (which term encompasses Ziegler-Natta catalysts), metallocene catalysts, chromium catalysts and other organometallic or coordination catalysts and the different catalysts may be of the same or different types, e.g. Ziegler plus metallocene, metallocene plus metallocene, Ziegler plus Ziegler, organometallic plus metallocene, etc. Preferably the catalyst comprises a cyclopentadienyl-containing organometallic compounds, e.g. metallocene e.g. those including also modified cyclopentadienyls comprising nitrogen, phosphorus, boron or sulphur in the ring and a chromium oxidic catalyst. More preferably the cyclopentadienyl-containing organometallic compound comprises two of such cyclopentadienyl skeletons.

Where the multisite catalyst comprises a metallocene and chromium oxide the catalyst is preferably prepared as described in NO981631 which is herein incorporated by reference.

Where one catalyst type in the catalyst material used in the process of the invention is a Ziegler catalyst it is especially preferred that at least one non-Ziegler catalyst type also be present, e.g. a metallocene. In any event the catalyst must comprise at least two active catalytic sites, one of which is sensitive and the other insensitive to hydrogen concentration.

The catalyst material may include one or more co-catalysts, catalyst activators or catalyst precursors, ie. the catalyst material may contain substances which react together to create a substance possessing the active polymerization site. Examples of these co-catalysts, catalyst activators and catalyst precursors include aluminium trialkyls (e.g. triethylaluminium), aluminoxanes such as methylaluminoxane, cationic activators such as boron containing compounds, transition metal compounds (e.g. halogenide compounds), magnesium compounds, group III organometallic compounds, e.g. aluminium or boron based compounds. Such materials may be solids, liquids or may be in solution in a liquid phase of the catalyst material which may be a solution, a solid, a dispersion, a suspension, a slurry, etc.

Preferred aluminoxanes include $C_{1-10}$ alkyl aluminoxanes, in particular methyl aluminoxane (MAO) and aluminoxanes in which the alkyl groups comprise isobutyl groups optionally together with methyl groups. Such aluminoxanes may be used as the sole co-catalyst or alternatively may be used together with other co-catalysts. Thus besides or in addition to aluminoxanes other cation complex forming catalyst activators may be used. In this regard mention may be made of the silver and boron compounds known in the art. What is required of such activators is that they should react with the η-liganded complex to yield an organometallic cation and a non-coordinating anion (see for example the discussion on non-coordinating anions J⁻ in EP-A-617052 (Asahi)).

Aluminoxane co-catalysts are described by Hoechst in WO 94/28034. These are linear or cyclic oligomers having up to 40, preferably 3 to 20, —[Al(R")O]— repeat units (where R" is hydrogen, $C_{1-10}$ alkyl (preferably methyl and/or isobutyl) or $C_{6-18}$ aryl or mixtures thereof).

The catalyst material will generally include a support, e.g. an inorganic or organic carrier material, preferably a solid particulate material and also preferably a porous material. Conventional catalyst support materials may be used in this regard, e.g. porous inorganic or organic materials, for example oxides such as silica, alumina, silica-alumina, silica with titania, zirconia, etc, non-oxides such as magnesium halides, e.g. $MgCl_2$, aluminium phosphate, zeolites etc, celluloses, starches, and polymers such as polystyrene, polymethacrylate, polystyrene-divinylbenzene and polyolefins such as polyethylene and polypropylene.

Carrier materials, especially inorganic materials, are preferably thermically and/or chemically pre-treated and the water content or the OH group concentration is to be set as defined or kept as low as possible. Chemical pre-treatment can e.g. comprise reaction of the carrier with aluminium alkyl. Anorganic carriers are usually heated to 100° C. to 1000° C. for 1 to 100 hours before use. The surface of such anorganic carriers, especially of silica ($SiO_2$) is between 10 and 1000 $m^2/g$, preferably between 100 and 800 $m^2/g$. The median weight average particle diameter is between 0.1 and 500 micrometers ($\mu$), preferably between 10 and 200$\mu$.

Support impregnation with the catalysts and any cocatalysts or catalyst activators may be performed as described in WO96/00245, WO95/11264, EP-A-619325 or, more preferably, WO95/12622. If desired, a prepolymerization may be effected, e.g. as described in U.S. Pat. No. 5,240,894, so that prepolymerized catalyst particles are used in the major polymerization stage(s).

Where a support material is used, this will especially preferably be used to carry more than one type of catalytic site, ie. so that a particulate support will present two or more different active polymerization sites on the same particles.

Where different types of catalytic sites are present on the same carrier particles, it is preferred that the ratio between the different types of site be substantially uniform within the particles, ie. it is preferred that the ratio be the same on the surface as it is at different depths within the particles and that the ratio be substantially uniform between the particles.

Where a co-catalyst or catalyst activator is used, it will be especially preferred to have the activated catalyst system loaded onto a particulate support. Alternatively but less preferably the activatable catalytic site precursor may be loaded onto a particulate support which is placed in a solution of the cocatalyst or activator.

Where co-catalysts or catalyst activators for different catalytic site precursors are used, it is preferred to load these and at least one of the catalytic site precursors onto a support simultaneously rather than sequentially. In this way the apparatus used is used more efficiently and the total time required for preparing the supported catalyst is reduced since sequential impregnation have a time-consuming further impregnation step. Sequential impregnation is thus a more complicated process and disadvantageously requires the use of more solvent. Moreover, in this way the catalysts and co-catalysts or activators are distributed more uniformly (relative to each other) in the support. As a result, properties of the resulting polymer products are enhanced.

More particularly the simultaneous loading of different catalytic site precursors upon a support results in the production, in a subsequent single or multistage polymerization, of a reactor powder (the polymer product of the polymerization process) which has good inter-particle homogeneity, and a broad, e.g. bimodal, MWD. More especially, the homogeneity achieved is better than that achievable by simply using a mixture of supported catalysts, each carrying a single catalyst system, and the simultaneously multiply (e.g. dually) impregnated catalysts have high activity in terms of polymer production.

Viewed from a further aspect therefore the invention provides a process for the preparation of a supported catalyst, said process comprising contacting a porous particulate support material (e.g. silica, alumina, zirconia, magnesium chloride, etc.) with a solution comprising at least two different catalytically active materials or precursors therefor (e.g. procatalysts) providing at least catalytic sites A and B as hereinbefore defined, and optionally comprising at least one co-catalyst or catalyst activator, and recovering said support material impregnated with said catalytically active materials or precursors or reaction products thereof with said cocatalyst or catalyst activator, preferably wherein the liquid content of said solution and said support material before contact thereof with said solution is less than 3, more preferably less than 2.5, most preferably less than 1.0 times the pore volume of said support material.

In this process, the support material may be used while it is partially impregnated with a non-aqueous liquid, e.g. a hydrocarbon (preferably a saturated or aromatic hydrocarbon). At least one, and preferably at least two of the catalysts or procatalysts preferably comprise η-liganded complexes as discussed herein.

The η-liganded complexes may be used together with Lewis acids, Brönsted acids or Pearson acids, or additionally in the presence of Lewis bases.

Such Lewis acids are, for example, boranes or alanes, such as aluminium alkyls, aluminium halogenides, aluminium alkoxides, boron organyles, boron halogenides, boron acid esters or boron or aluminium compounds which contain both halogenide and alkyl or aryl or alkoxide substituents, and also mixtures thereof or the triphenylmethyl cation. Especially preferred are aluminium oxanes or mixtures of aluminium-containing Lewis acids with water. All acids work as ionising agents, according to modern knowledge, which form a metallocenium cation, load-compensated by a bulky, badly coordinating anion.

Furthermore, the invention relates to the reaction products of such ionising agents with η-liganded complexes.

Examples of such badly coordinating anions are, e.g. or sulphonates such as tosylate or triflate, tetrafluoroborates, hexafluorophosphates or antimonates, perchlorares, and also voluminous cluster molecule anions of the type of the carboranes, for example $C_2B_9H_{12}^{\ominus}$ or $CB_{11}H_{12}^{\ominus}$. If such anions are present, metallocene compounds can also work as highly-effective polymerisation catalysts even in the absence of aluminium oxane. However, it can also be advantageous to use such metallocene complexes with voluminous anions in combination with aluminium alkylenes such as $(CH_3)_3Al$, $C_2H_5)_3Al$, $(n-/i-propyl)_3Al$, $(n-/t-butyl)_3Al$, $(i-butyl)_3Al$, the isomers pentyl, hexyl or octyl aluminium alkyl, or lithium alkylenes such as methyl-Li, benzyl-Li, butyl-Li or the corresponding Mg-organic compounds, such as Grignard compounds or Zn-organyls. On the one hand, such metal alkyls transfer alkyl groups to the central metal, on the other hand they capture water or catalyst poisons from the reaction medium or monomer during polymerisation reactions. Examples of boron compounds from which such anions can be derived are:

triethylammonium-tetraphenylborate,
tripropylammonium-tetraphenylborate,
tri(n-butyl)ammonium-tetraphenylborate,
tri(t-butyl)ammonium-tetraphenylborate
N,N-dimethylanilinium-tetraphenylborate,
N,N-diethylanilinium-tetraphenylborate,
N,N-dimethyl(2,4,6-trimethylanilinium-tetraphenylborate,
trimethylammonium-tetrakis(pentafluorophenyl)borate,
triethylammonium-tetrakis(pentafluorophenyl)borate,
tripropylammonium-tetrakis(pentafluorophenyl)borate,
tri(n-butyl)ammonium-tetrakis(pentafluorophenyl)borate,
tri(sec-butyl)ammonium-tetrakis(pentafluorophenyl)-borate,
N,N-dimethylanilinium-tetrakis(pentafluorophenyl)borate,
N,N-diethylanilinium-tetrakis(pentafluorophenyl)borate,
N,N-dimethyl(2,4,5-trimethylanilinium-tetrakis(pentafluorophenyl)borate,
trimethylammonium-tetrakis(2,3,4,6-tetrafluorophenyl)-borate,
triethylammonium-tetrakis(2,3,4,6-tetrafluorophenyl)-borate,
tripropylammonium-tetrakis(2,3,4,6-tetrafluorophenyl)-borate,
tri(n-butyl)ammonium-tetrakis(2,3,4,6-tetrafluorophenyl)-borate,
dimethyl)(t-butyl)ammonium-tetrakis(2,3,4,6-tetrafluorophenyl)-borate,
N,N-dimethylanilinium-tetrakis(2,3,4,6-tetrafluorophenyl)-borate,
N,N-diethylanilinium-tetrakis(2,3,4,6-tetrafluorophenyl)-borate,
N,N-dimethyl-(2,4,6-trimethylanilinium)-tetrakis-(2,3,4,6-tetrafluorophenyl)-borate,
dialkylammonium salts, such as:
  di-(i-propyl)ammonium-tetrakis(pentafluorophenyl)-borate and
  dicyclohexylammonium-tetrakis(pentafluorophenyl)borate;
tri-substituted phosphonium salts, such as:
  triphenylphosphonium-tetrakis (pentafluorophenyl)borate,
  tri(o-tolyl)phosphonium-tetrakis (pentafluorophenyl)-borate,
  tri(2,6-dimethylphenyl)phosphonium-tetrakis (pentafluorophenyl)borate,
  triolylmethyl-tetrakis(pentafluorophenyl)borate,
  triphenylmethyl-tetraphenylborate (trityl-tetraphenyl-borate),
  trityl-tetrakis(pentafluorophenyl)borate,
  silver tetrafluoroborate,
  tris(pentafluorophenyl)borane,
  tris(trifluoromethyl)borane.

Co-catalysts are, for example, aluminiumoxane compounds, e.g. methyl aluminoxane (MAO).

It is also possible to use a mixture of various aluminoxanes or a mixture of their precursors (aluminium alkyls or alkylaluminium halogenides) in combination with water (in gaseous, liquid, solid or bound form, also as crystallised water). The water can also be supplied as (residual) dampness of the polymerisation medium, the monomer or a carrier such as silica gel.

Other co-catalysts are aluminium alkyls, lithium alkyls or Mg-organic compounds such as Grignard compounds or partially-hydrolysed boron organyls. Aluminium oxanes are the preferred co-catalysts.

Activation with the co-catalyst, or production of the voluminous non- or weakly co-ordinating anion can take place in the autoclaves or in a separate reaction container (pre-forming). Activation can take place in the presence or absence of the monomers which are to be polymerised. Activation can be undertaken in an aliphatic or aromatic or halogenated solution or suspension medium, or on the surface of a catalyst carrier material.

It will be recognised that the catalyst material used in the process of the invention is not limited to being of certain metal types but instead to being a combination of catalysts, optionally with certain affinity for comonomer incorporation, and capable of producing polymers of appropriate molecular weights under the reaction conditions in the various polymerization reactors used in the process of the invention.

Examples of suitable catalyst types include the Ziegler catalysts disclosed in U.S. Pat. No. 5,151,397, the titanium and vanadium catalysts and zirconium metallocenes of EP-A-318048, the metallocene and aluminoxane catalysts of EP-A-206794, the Ziegler-metallocene catalysts of EP-A-447070 (e.g. comprising zirconium metallocenes, titanium and/or vanadium halides, magnesium dichloride and optionally organo-aluminium compounds such as aluminoxanes), the bisindenyl metallocene of EP-A-643084, the metallocenes of EP-A-69951, the biscyclopentadienyl metallocenes of EP-A-410734, and the metallocenes and aluminoxane catalysts of EP-A-128045.

In general metallocenes, ie. η-liganded metal complexes form part of the multi-site catalyst. By η-ligand is meant a ligand which coordinates the metal with Π-orbital electrons. Metals may be complexed for example with 1, 2 or 3 η-ligands. Complexes of metals with two η-ligands are generally termed metallocenes but the term metallocene is used herein to refer to catalytically active complexes containing at least one, e.g. 1, 2 or 3 η-ligands. η-liganded complexes based on zirconium, hafnium and titanium are preferred as catalysts. The η-bonding ligands in such catalysts may be simple unsubstituted homo- or heterocyclopentadienyl rings, but preferably they will be optionally substituted fused ring systems (e.g. indenyl ligands), substituted cyclopentadienyl rings, optionally substituted bridged bis-cyclopentadienyl ligands or optionally substituted bridged bis fused ring systems (e.g. bis indenyl ligands). Suitable examples are discussed for example in EP-B-35242 (BASF), EP-B-129368 (Exxon) and EP-B-206794 (Exxon).

It is preferred that a single site catalytic site is used for providing site A, i.e. a site that would by itself in a one-site catalyst give a polymer with Mw/Mn below 3.5 and gives about the same frequency of comonomer incorporation in different polymer chains.

Metallocene catalysts will generally be catalysts providing site A. Preferred for use are unbridged and bridged bis-η-liganded complexes of group 4, 5 or 6 metals, e.g. where the unbridged η-ligand complexes are metallocenes with two homo or heterocyclopentadienyl ligands which are optionally ring substituted by fused or pendant substituent groups and the bridged η-ligand complexes comprise two η-liganding groups joined by a 1 to 4 atom chain where there is no direct chemical anchoring of the metal to a support surface. One example of a metallocene is an unbridged biscyclopentadienyl Ti, Zr or Hf compound, another is a bridged bis-indenyl Ti, Zr or Hf compound, e.g. $Cp_2Zr\,Cl_2$ and $CH_2CH_2(Ind)_2Zr\,Cl_2$ or $Si(CH_3)(Ind)_2ZrCl_2$, a further is a dimethylsilylbis(fluorenyl) Ti, Zr or Hf complex (e.g. $SiMe_2(fluorenyl)ZrCl_2$) and still further is a bis n-butylcyclopenta-dienyl Ti, Zr or Hf complex.

Especially preferred are group 4 metallocenes. One class of metallocene complexes producing high molecular weight polymers which may be used in the catalyst material comprises compounds having one cyclopentadienyl ligand in conjunction with another ligand; e.g. (cyclopentadienyl-hydrido-boro-trispyrazol)-zirconium dichloride. (Other such materials are disclosed in WO97/17379 (Borealis) and the publications referred to therein).

There are also metal complexes suitable for use as a high molecular weight producing catalysts that do not contain any cyclopentadienyl rings; e.g. {3,3'-methoxy,1,1'-(tert)butyl-bi-phenoxy}titanium-di-benzyl.

In general such non η-ligand containing ligands joined onto the catalytic active metal through at least one nitrogen atom. Examples of state of the art complexes are given in G. G. Hlatky, et al proceedings of Metallocenes Europe 1998; Schotland Business Research, Inc. USA 1998.

Such complexes containing ligands bound to the catalytic active metal through at least one nitrogen atom may optionally contain one or more ligands in addition.

A single site catalyst that can be used in the catalyst material to generate lower molecular weight components of the overall polymer product may conveniently be a metallocene in which the cyclopentadienyl (or equivalent, e.g. indenyl, etc) groups are not joined by a bridge or where the cyclopentadienyl rings are joined by a bridge. Again the metal may be any group III to VI metal, e.g. zirconium. Example of such metallocenes include:

rac-ethylene-bis(1-indenyl)zirconium dichloride;
rac-ethylene-bis(4,5,6,7-tetrahydro-1-indenyl)-zirconium dichloride;
bis(n-butylcyclopentadienyl)hafnium dichloride
bis(n-butylcyclopentadienyl)zirconium dichloride;
bis(1,2-dimethylcyclopentadienyl)zirconium dichloride;
bis(1,3-dimethylcyclopentadienyl)zirconium dichloride;
bis(4,7-dimethylindenyl)zirconium dichloride;
bis(1,2-ethyl,methylcyclopentadienyl)zirconium dichloride;
bisfluorenylzirconium dichloride;
bisindenylzirconium dichloride;
biscyclopentadienylzirconium dichloride; and
bistetrahydroindenylzirconium dichloride.

All of the complexes mentioned above as suitable for the production of high and low molecular weight components of the overall polymer may be used in conjunction with an aluminoxane. Moreover equivalent complexes in which the halide is replaced by a hydrocarbon ligand (e.g. alkyls, aryls, aralkyls, allyls and alkenyls, e.g. with up to 10 carbons). In this case however the complexes need to be activated by a cationic activator such as a boron compound or an aluminoxane or a mixture of such activators. Alternatively the halides may be replaced by a pendant group which also contains an anionic function. In such case the catalytically active metal is in a cationic form resulting in a complex present in a zwitterionic form. Examples of such complexes are given in G. Erker et al, Macromolecules 1997, 30, 3955 and literature cited therein.

Ziegler catalysts which may be used for the production of the catalyst material are catalysts which normally consist of (i) a transition metal compound, usually a halogenide, supported on a porous carrier, (ii) a metalIorganic cocatalyst where the metal is a group III metal such as Al or B, and (iii) a magnesium compound. Ziegler catalysts are well known in the art. To produce increasingly higher molecular weight polymers, the transition metal in the Ziegler catalyst can be changed from titanium to zirconium to hafnium for example. In general where the catalyst material used in the process of the invention includes a Ziegler catalyst and a single site catalyst, the Ziegler catalyst will function to produce the higher molecular weight component of the overall polymer product.

The different types of catalyst sites or precursors therefor in the catalyst material used in the process of the invention may be present in substantially equal numbers (ie. a mole ratio of 1:1, or 1:1:1, etc. for two or three catalyst-type systems). However one catalyst type may be predominant with other catalyst types being present at a relative mol. % of for example 1 to 100% (100% representing a 1:1 mole ratio), preferably 5 to 80%, especially 10 to 70%.

Generally the quantity of catalyst used will depend upon the nature of the catalyst, the reactor types and conditions and the properties desired for the polymer product. Conventional catalyst quantities, such as described in the publications referred to herein, may be used.

One beneficial feature of the multisite catalysts invention is that they give rise to polymer products with improved molecular weight distributions. The advantage of the products may be demonstrated by analysis of their rheology. This may be done (as described by Brydson in "Flow properties of polymers", Iliffe Books, London, 1970) by plotting apparent viscosity P against apparent shear rate 1/s.

This advantage of the products of the process of the invention as compared with a similar product made in a similar multistage reactor process but using only a metallocene catalyst or only a Ziegler catalyst or using a dual site catalyst which is a combination of metallocene catalysts both of which produce polymers the MW of which is strongly dependent on the hydrogen concentration used is that for the product according to the invention if it has similar melt strength (hauloff force) then it will have improved processability while if it has similar processability then it will have improved melt strength. Moreover, the polymer product according to the invention will have a relatively higher degree of advantageous strain hardening and a higher zero shear viscosity.

Thus viewed from a further aspect the invention a high melt strength (high hauloff force versus molecular weight) olefin polymer, obtainable by a process as hereinbefore defined.

Figure 2:
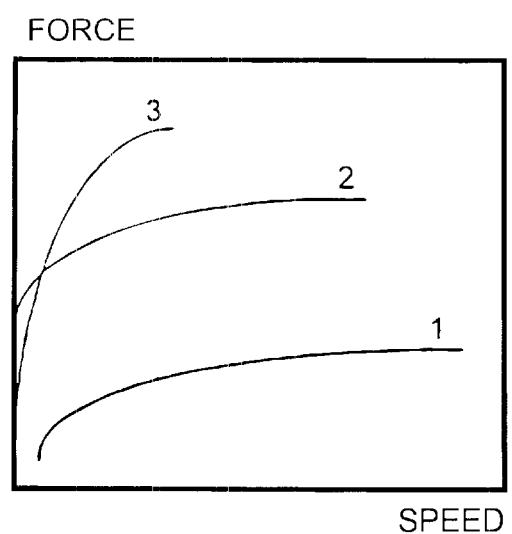
FIG. 2 is a plot of force against speed using the apparatus of FIG. 1.

On the plot in FIG. 2, the three curves correspond to the formula $$HO = A*(B+\eta_{0.05})^D - C.$$

HO is the haul [of] off value (melt strength) in g. $\eta_{0.05}$ is the melt viscosity (Ns/m2) at a shear rate of 0.05 s$^{-1}$. A, B, C and D are constants defining the curve and have the following values

| Constant | Value set a | Value set b | Value set c |
|---|---|---|---|
| A | 0.024 | 0.008 | 0.005 |
| B | 20000 | 25000 | 25000 |
| C | 2.6 | 2.5 | 2.4 |
| D | 0.5 | 0.6 | 0.65 |

The polymers obtainable by the process of the invention preferably have haul off values higher than those calculated according to the formula above with a value set C.

Where the catalyst is a dual site catalyst having sites A and B, it is preferred that in at least one polymerization stage the reaction conditions are selected such that site A produces a polymer having a melt flow rate (e.g. MFR$_{21}$) higher than that produced by site B and such that in a previous or further polymerization stage site A produces a polymer having a lower melt flow ratio than in said at least one polymerization stage while site B produces a polymer having substantially the same melt flow ratio as in said at least one polymerization stage.

It should be noted that the melt strength typically increases with increasing molecular weight and viscosity and with decreasing MFR. (See Intern. Polymer Processing V (1990)4, p284).

It should be noted that preferentially both sites are considered active in at least one of the reactors, and preferentially in both reactors. This is so because keeping as many sites active as long as possible throughout the process is a means of reducing catalyst consumption and thereby production costs. Besides, it is believed that this gives a more intimate mixing of the polymer components in the polymer powder.

Furthermore, it is preferred that site A produces polymer of lower MW in the first than in the second reactor. This is preferred because then, in case of the preferred usually very hydrogen sensitive metallocene sites, hydrogen is almost completely consumed in the first reactor, so it does not have to be removed from the process stream going from the first to the second reactor. This means that low molecular weight polymer produced by site A can be made in the first reactor, without the hydrogen added in the first stage causing difficulties for the polymerization in the second reactor. Thus in the second reactor can be prepared high molecular weight polymer by site A, and here can also be fed comonomer. If the order of the reactors is changed, comonomer would need to be added in the first reactor, which give rise to serious problems in removing comonomer before the next reactor.

The MFR and MW values produced by individual catalysts sites in individual polymerization stages may for the purposes of this text be taken to be the values produced by the same catalytic site, used in the absence of further catalysts, in a single polymerization stage performed under the same conditions. It is preferred that the final product has a $\eta_{300}$ between 400 and 2000 Ns/m$^2$, more preferably between 600 and 1600 Ns/m$^2$.

Viewed from another aspect the invention provides a polyolefin, preferably an ethylene or homo- or copolymer, most preferably a polyethylene copolymer, that is preferably essentially free from long chain branching obtainable by a process as hereinbefore described and which preferably has a melt strength which satisfies the equation HO=A*(B+$\eta_{0.05}$)^D−C, when HO is the haul of value (melt Strength) in g. $\eta_{0.05}$ is the melt viscosity (Ns/m2) at a shear rate of 0.05 s$^{-1}$, A=0.005, B=25000, C=2.4 and D=0.65 and that comprises a low MW component and a high molecular weight component, the low MW component constituting 20 to 80 wt % of the total polymer, preferably 35 to 60 wt % and preferably having a Mw/Mn of less than 10; and the high MW component constituting 15 to 75 wt %, preferably 35–60% and having a Mw/Mn of less than 10;

and the ratio of peak MW of the High MW component over that of the low MW component is above 2.

The processes of the invention may be used with particular advantage to tailor the distribution of molecular weights in the higher molecular weight fraction of the overall polymer. It is preferred that the ratio of Mw made by site A in the reactor where it makes high molecular weight polymer and the Mw in the reactor considered where it makes low molecular weight polymer is above 2. It is especially preferred if this ratio is above 3.5, especially 5 since the polymer from site A will then achieve advantageous bimodal properties.

Viewed from a further aspect the invention provides polymers obtained by a polymerization process according to the invention.

The polymers produced using the catalysts or processes according to the invention has beneficial properties relative to polymers produced using conventional techniques. In particular, for ethene homo and copolymers, the polymer product preferably has:

1. An extremely high FRR21/2 (ie. the ratio of MFR21 to MFR2). This is of benefit since the high shear viscosity is low. More particularly FRR21/2 is conveniently at least 50 and more preferably at least 70, most preferably above 100.

2. A higher proportion of the overall polymer is made in the reactor stage where site A gives a lower MW polymer. Typically, this fraction is 10–95%, preferably 20–90%, more preferably 50% to 90%, still more preferably 60–90% by weight of the overall polymer. This results in an improved balance of polymer properties.

3. The final extruded polymer product has a high degree of homogeneity. The homogeneity of the polymer is often a matter of particular concern to end users since inhomogeneity may give rise to phenomena known as fish eyes, gels or white spots. This is particularly important for films but is also important for wires, cables, blow moulded products and black pipe.

The production of highly homogeneous multicomponent, e.g. bimodal, olefin polymers in a single polymerization stage has up to now been problematical. The use of simultaneous coimpregnation of catalyst support particles in the process of the invention to produce supported catalysts having two or more catalytic sites results in supported catalysts which can be used to produce highly homogeneous polymers in multistage polymerizations, particularly highly homogeneous bimodal polymer powders.

Advantageously, the A-sites used are η-liganded metal complexes, e.g. homo or heterocyclopenta-dienyl liganded complexes as discussed herein. These would usually have single-site properties. Preferably the A-sites used have single site properties. By this is meant that they alone under the conditions used are able to produce rather narrow molecular weight distributions, i.e Mw/Mn<3.5 and able to give copolymer where the probability of finding a comonomer unit along the chain at any position is roughly equal between all polymer molecules. It should be understood, however, that terminal units and monomer units immediately adjacent to a comonomer unit may have different probabilities. This is preferred because otherwise it may be difficult to achieve satisfactory control over the polymer composition. This could again lead to poor optical properties or unwanted transportability of a low MW and high comonomer fraction of the polymer component.

Moreover the proportion of the polymer produced by catalyst sites A and B in the overall polymer is preferably at least 70 wt % in sum. Furthermore it is preferred that at least 90 wt % of the polymer is prepared in a single polymerization stage, ie. under essentially similar process conditions. The proportion of the overall polymer produced by site A may be 40 to 95% wt, preferably 50 to 92% wt. The proportion of the overall polymer produced by site B may be 3 to 30% wt, preferably 5 to 25% wt.

Viewed from further aspect the invention provides the use of the polymers of the invention, optionally after formulation with additives (e.g. filters, colours, antistatic agents, carbon black, stabilizers, antioxidants, plasticizers, etc.) and extrusion and/or grinding and/or pelletization, for the preparation of films, fibres, pipes or moulded products or for cable or wire applications.

All of the documents referred to herein are hereby incorporated by reference.

The invention will now be described further with reference to the following non-limiting Examples and with reference to the accompanying drawings in which FIG. 1 is a schematic diagram of an apparatus for measuring melt strength and FIG. 2 is a plot of force against speed determined using apparatus of FIG. 1.

Parameter Determination

FRR's: FRR21/2=MFR21/MFR2.

MW, Mn, MWD: Measured by GPC—Gel permeation chromatography. MW: weight average molecular weight. Mn: Number average molecular weight.

Component peak MW's are found from the MWD curve from GPC.

The MWD from a GPC measurement is by convention presented as a curve in a diagram where:

the abscissa is the log (MW) (MW is molecular weight)

the ordinate is the dW.MW/d(MW)) W is mass or mass fraction of polymer.

At very low and very high MW values, the ordinate value usually is low or zero. At some intermediate MW there is at least one maximum point.

A polymer made in one polymerization step under non-changing process conditions with a catalyst that is not specifically aimed at containing more than one type of active site, usually makes a polymer with one maximum only. Usually the distribution then resembles a normal (Gaussian) distribution with a linear (non-logarithmic) abscissa. However, when the catalyst system is prepared so that several types of active sites occur giving much different MW's, or the polymerization conditions is changed in steps so that the steps give very different MW's, then this gives rise to more complicated MWD curves with either more than one maximum or at least one maximum and one shoulder, each maximum and each shoulder originating from one polymer component as described before. By studying such a MWD curve, one can decompose it and identify the approximate MWD's of the components and estimate each components' approximate maximum. Such a maximum is a component peak MW.

Extrusion

Polymer batches were extruded on a Brabender Plasticorder before rheology testing, measurement of melt flow rate and before microscopy analysis. The screw diameter was 20 mm and the length/diameter ratio 25. It was run at 100 rpm, and the zone temperatures were 140, 160, 180, 180, 180 and 180 C.

Polymer Powder Fines

The particle distribution of polymer was measured on a Malvern Series 2600 particle size analyser. Weight percent undersize was measured.

MFR's

Melt flow rate (MFR) values were determined according to ISO 1133 at 190° C.: MFR2 according to condition D (2.16 kg), MFR5 according to condition T (5 kg), MFR21 according to condition G (21.6 kg). It is measured as g/10 min.

FRR21/2 is the ratio of MFR21/MFR2, and FRR5/2 is the ratio of MFR5/MFR2.

Melt Viscosity

The viscosity was measured with a Rheometrics RDA II rheology dynamic rheology analyzer, also called a dynamic spectrometer. The measurements were performed according to ISO 6721-10. The temperature used was 190° C. Parallel plate geometry was used. The plates were 25 mm in diameter and the distance between plates was 1.5 mm. The viscosity was measured at different shear rates through a frequency sweep from 0.1 to 300 s−1. The viscosity depends on the shear rate. It is measured in Ns/m2 (Pas). The term $\eta_f$ means the viscosity at a shear rate of f s−1, so for example $\eta_{0.05}$ is the viscosity at a shear rate of 0.05 s−1.

Haul Off Parameter

The melt strength or haul off parameter was measured by using an apparatus 1 as seen on the schematic diagram of the attached FIG. 1. The apparatus consists of a capillary rheometer of trademark "Rosand RH-7", a haul off device and a force transducer to measure the strength of the polymer melt. The inner diameter of the barrel is 15 mm, and is equipped with a fitting piston. A polymer sample was conditioned in the rheometer for 10 minutes at 190° C. Then the sample was extruded by means of a piston at piston velocity of 1 mm/min to press the melt vertically downwards through a cylindrical die having an opening inlet angle of 190 degrees, a diameter of 1 mm and a length of 16 mm. From the die, the monofilament passed essentially vertically down to the force measuring device, placed at a position of 25 cm below the die outlet. At this point the monofilament has solidified. The force measuring device consists of a free rolling wheel under which the monofilament passes free rotating wheel attached to a weighing device not shown. The monofilament then passes the essentially vertically upwards onto one free rolling roller and wound onto the last roller. The draw off speed is determined by this last roller, and is set at 1 m/min at this point.

The force that is exerted upwards by the polymer upwards on the free rolling wheel is measured in grams. Then this value is divided by a factor of two to get the melt strength or haul off parameter. Thus if the total force exerted upwards by the polymer monofilament on the wheel is 0.098 N, this is measured as 10 g, and this again corresponds to a melt strength or haul off parameter of 5 g.

If a different draw off speed is used, usually the haul off value will be different. If a polymer of much higher melt viscosity is measured, it will usually be seen that this will have a higher haul off parameter.

The results, e.g. as shown in FIG. 2, are typically presented as graphs of force/melt strength against drawdown speed. The graphs enable interpretation of degree of melt strength (e.g. curve 1 vs 2) for different linear polymers. Alternatively degree of strain hardening due to broad MWD or long chain branching (curve 2 vs 3).

Linear polymers will typically show slow increase in melt strength with increasing drawdown (curves 1 and 2) The level will reflect the molecular weight of polymer. Broad MWD and content of branching can affect slope of stress increase (compare curves 2 and 3) due to different degrees of strain hardening.

Microscopy

A plate was pressed from the extruded polymer from the polymerization test. From the plate, six different microtome sections of 20 micrometer thickness were made. From each of the sections, an area of 1.06*0.8 mm (length*breadth) was studied by microscopy to identify the gels in it. The size of each gel was measured with help of a microscope.

The volume fraction of gels were calculated by the formula:

$$\varepsilon = \frac{\pi * \sum_{i=1}^{m}(D_i^2)}{4*n*L*B}$$

Here m is the total number of gels in the sample, Di is the measured diameter of each gel, L and B the length and breadth of each microtomed section, and n is the number of microtomed sections.

EXAMPLE

Preparation of Catalysts

Supported Catalyst (x)

Catalyst XPO9702 from Grace company was used as the starting material. This catalyst contains 0.4 w % of Cr, supported on a porous, particulate silica carrier. It was activated in a fluidized bed at 645 C by passing through it a flow of dried air. Afterwards, it was kept under dry nitrogen.

Supported Catalyst (y)

The catalyst preparation was done in a nitrogen-filled glove box.

The following chemicals were mixed and stirred:

0.0138 g (nBuCp)$_2$HfCl$_2$ 1.1 ml 30 w % MAO toluenic solution 0.6 ml toluene

The resulting solution was added under stirring dropwise to 1 g of 55SJ, a porous particulate silica supplied by Grace company. The silica had been previously calcined in a fluidized bed at 600 C by passing through it a flow of dry air. Then the catalyst was dried by a nitrogen flow.

Supported Catalyst (z)

The catalyst preparation was done in a nitrogen-filled glove box.

The following chemicals were mixed and stirred:

0.027 g (nBuCp)$_2$HfCl$_2$ 2.4 ml 30 w % MAO toluenic solution 1 ml toluene

The resulting solution was added dropwise to 2 g of supported catalyst (x) (prepared as described above) under stirring. Then the catalyst was dried by a nitrogen flow.

Catalyst T

The catalyst was prepared essentially as cat y from the application, except: 0.0177 g racemic dimethylsilylbis (2-methyl-4-phenyl-indenyl)zirconiumdichloride was added instead of the hafnocene. Catalyst (Y1)

(Y1) is a parallel batch of catalyst (y).

The weight median average size of the carrier (55SJ) is 50 micron, and the pore volume 1.6 ml/g.

Z1 (SS-Cr)

Z1 was made as catalyst z except: 7 ml of toluene was used instead of 1 ml, and the supported catalyst x used in the preparation was made differently from catalyst x in the following way: A chromium oxide catalyst from Grace with the following characteristics was used: It has a Cr content of 0.4 w %, a pore volume of 1.84 ml/g, a specific surface of 330 m2/g and a weight median average size of 56 micron.

Catalyst X1

X1 is a parallel batch to catalyst (x).

Polymerization

Polymerization was carried out in a 2.3 l reactor fitted with a stirrer. 1 liter isobutane, and optional hexene and supported catalyst was charged into the reactor. The temperature in the reactor was adjusted to the desired value. Ethylene, optionally containing hydrogen, was added through a pressure control valve set at the desired polymerization pressure and maintained at this pressure. At the end of stage 1, the pressure was reduced to boil off unreacted ethylene and hydrogen. Stage 2 was started by introducing, optionally, hexene. Then ethylene, optionally containing hydrogen, was added to the reactor to achieve the desired pressure. After the required reaction time, the polymerization was stopped by venting of the overpressure in the reactor. At the end of the polymerisation period, optionally a gas sample was taken from the headspace of the reactor. The sample was analysed by gas chromatography for hydrogen.

For comparison, single stage polymerizations were also carried out.

The results are set out in Tables 1 to 3.

TABLE 2

| Mix 1: Reference Cat system | | invention BC2002 | | Mix 2: Simulated BC2002-CrOx | |
|---|---|---|---|---|---|
| Polymerisation | | | | | |
| Run | | 30200 | 30182 | 30194 | 30191 |
| H2 in C2= | molppm | 2000 | 0 | 2000 | 0 |
| MFR$_2$ | g/10 min | 46 | 0.19 | 8.2 | 0.08 |
| MFR$_{21}$ | g/10 min | 970 | 3.4 | 255 | 2.4 |
| FRR$_{21/2}$ | — | 21 | 18 | 31 | 30 |
| Mn | g/mol | 5000 | 7900 | 8000 | 43000 |
| Mw | g/mol | 60000 | 222000 | 175000 | 290000 |
| Peak MW | g/mol | 33000 | 195000 | 25000 | 165000 |
| Mw/Mn | — | 2.8 | 2.8 | 22 | 6.7 |
| Fraction SS | — | 100 | 100 | 0.82 (est) | 0.8 (est) |
| MFR$_{21}$ of SS( | g/10 min | 970 | 3.4 | 2000 (est) | 3.4 (est) |
| MFR$_{21}$ of Cr( | g/10 min | — | — | 1.5 (est) | 1.5 (est) |
| Mixed + extruded samples | | Mix 1 | | Mix 2 | |
| Composition | | | | | |
| Blend fractions | — | 0.57 | 0.43 | 0.70 | |
| Fraction LMW (=SS 1.st stage) | | 0.57 | | 0.57 (est) | |
| Fraction Cr polymer | | 0.00 | | 0.18 (est) | |
| QC measurements | | | | | |
| MFR$_2$ | g/10 min | 1.4 | | 0.27 | |
| MFR$_{21}$ | g/10 min | 50 | | 22 | |
| FRR$_{21/2}$ | — | 36 | | 81 | |
| Density | g/l | 951.7 | | 951.3 | |
| GPC | | | | | |

TABLE 1

| Type | Stage one only | | Stage two only | | Both stages | | | Both stages reversed order |
|---|---|---|---|---|---|---|---|---|
| Catalyst | Catalyst (x) | Catalyst (z) | Catalyst (y) | Catalyst (z) | Catalyst (z) | Catalyst (y) | Catalyst (z) | Catalyst (z) |
| Catwt g | 0.355 | 0.297 | 0.194 | 0.274 | 0.238 | 0.250 | 0.273 | 0.264 |
| STAGE 1 | Yes | Yes | Omitted | Omitted | Yes | Yes | Yes | Yes |
| Temp C. | 95 | 95 | — | — | 95 | 95 | 85 | 85 |
| Pressure bar g | 32 | 32 | — | — | 32 | 32 | 29 | 29 |
| Hexene wt % in isobutan | 0.2 | 0.0 | — | — | 0.0 | 0.2 | 0.2 | 0.0 |
| Hexene added ml | 0 | 0 | — | — | 0 | 0 | 0 | 13 |
| H2 mol ppm in ethylene | 2000 | 2000 | — | — | 2000 | 2000 | 2000 | 0 |
| Time min | 40 | 40 | — | — | 40 | 40 | 35 | 30 |
| STAGE 2 | No | No | Yes | Yes | Yes | Yes | Yes | Yes |
| Temp C. | — | — | 85 | 85 | 85 | 85 | 85 | 85 |
| Pressure bar g | — | — | 29 | 29 | 29 | 29 | 29 | 32 |
| Hexene added ml | — | — | 13 | 13 | 13 | 0 | 13 | 0 |
| H2 mol ppm in ethylene | — | — | 0 | 0 | 0 | 0 | 0 | 2000 |
| Frctn polym step 2 wt % | 0 | 0 | 100 | 100 | 50 | 25 | 46 | 54 |
| Time min | 0 | 0 | | | 33 | 10 | 36 | 40 |
| Total | | | | | | | | |
| Total time min | 40 | 40 | 60 | 50 | 73 | 50 | 71 | 70 |
| Polymer g | 241 | 323 | 349 | 590 | 570 | 362 | 575 | 821 |
| Productivity g/g | 678 | 1088 | 1798 | 2153 | 2395 | 1448 | 2106 | 3109 |
| H2 in headspace g/g, hour | | | | | | | | |
| ANALYSES, Polymer | | | | | | | | |
| MFR0.095 | | | | | | | | |
| MFR2 g/10 min | 0.22 | 8.2 | 0.19 | 0.08 | 0.12 | 0.18 | 1.2 | 0.25 |
| MFR5 g/10 min | | 23.5 | 0.51 | 0.27 | 0.46 | 0.82 | | 0.92 |
| MFR2 g/10 min | 16 | 255 | 13.2 | 2.4 | 9 | 13 | 51 | 10.9 |
| Density g/l | 949 | 958 | 930 | 932 | 942 | 954 | 950 | 947 |

TABLE 2-continued

| | | | |
|---|---|---|---|
| Mn | g/mol | 15000 | 10000 |
| Mw | g/mol | 115000 | 170000 |
| Peak MW's | g/mol | 30000/195000 | 25000/200000 |
| Mw/Mn | — | 7.7 | 17 |
| Rheology | | | |
| $\eta_{0.05}$ | Ns/m2 | 5316 | 32694 |
| $\eta_{300}$ | Ns/m2 | 606 | 623 |
| Melt strength | g | 0.56 | 4.04 |
| Gels | | | |
| >0.1 mm* | — | 5 | 0 |
| <0.1 mm* | — | 13 | 8 |
| Gels' volume fraction | vol% | 2.5 | 0.4 |

| | Mix 3: Reference BC2002 | |
|---|---|---|
| Cat system | | |
| Polymerisation | | |
| Run | 30197 | 30097 |
| H2 in C2= molppm | 2000 | 0 |
| MFR2 g/10 min | 70 | 0,11 |
| MFR21 g/10 min | — | 1,7 |
| FR21/2 | — | 16 |
| Mn g/mol | — | — |
| Mw g/mol | — | — |
| Peak MW g/mol | — | — |
| Mw/Mn | — | — |
| Fraction SS | 100 | 100 |

TABLE 2-continued

| | | | | |
|---|---|---|---|---|
| MFR21 of SS | g/10 min | 1100 | 1,7 | |
| MFR21 of Cr | g/10 min | — | — | |
| Mixed + extruded | | Mix 3 | | |
| samples | | | | |
| Compositon | | | | |
| Blend fractions | — | 0.20 | | 0.80 |
| Fraction LMW (=SS 1.st stage) | — | 0,20 | | |
| Fraction Cr polymer | | 0.00 | | |
| MFR2 | g/10 min | 0,20 | | |
| MFR21 | g/10 min | 3,6 | | |
| FRR21/2 | — | 18 | | |
| Density | g/l | 954,1 | | |
| GPC | | — | | |
| Mn | g/mol | — | | |
| Mw | g/mol | — | | |
| Peak MW's | g/mol | — | | |
| Mw/Mn | — | — | | |
| Rheology | | | | |
| $\eta_{0.05}$ | Ns/m2 | 29437 | | |
| $\eta_{300}$ | Ns/m2 | 1782 | | |
| Melt strength | g | 1,50 | | |
| Gels | | | | |
| >0,1 mm* | — | — | | |
| <0,1 mm* | — | — | | |
| Gels' volume fraction | vol% | — | | |

*Number of gels
(est.) means the value is not directly analysed, but estimated.

TABLE 3

| Pol no | | 1 | 6 | 2 | 3 | | 4 |
|---|---|---|---|---|---|---|---|
| Poltest no. | | 30200 | 30180 | 30194 | 30182 | | 30191 |
| Cat-type | | y1 | x | z | y | | z |
| Cat identity | | | | | | | |
| Column no in table 1 in filing December 98 | | | 1 | 2 | 3 | | 4 |
| | | Stage one only | | | Stage two only | | |
| Cat name in filing December 98 | | | x | z | y | | 2 |
| Invention Reference | | Ref | Ref | Ref | Ref | Ref | Ref |
| Catalyst weight | g | 0.210 | 0.355 | 0.297 | 0.194 | 0.172 | 0.274 |
| STAGE 1 | | Yes | Yes | Yes | Omit | Omit | Omit |
| Temperature | C. | 95 | 95 | 95 | — | — | — |
| Pressure | bar g | 32 | 32 | 32 | — | — | — |
| Hexene | ml | 0 | 0 | 0 | — | — | — |
| Hydrogen | molppm in ethylene feed | 2000 | 2000 | 2000 | — | — | — |
| Time | min | 40 | 40 | 40 | 0 | 0 | 0 |
| STAGE 2 | | No | No | No | Yes | Yes | Yes |
| Temperature | C. | — | — | — | 85 | 94 | 85 |
| Pressure | bar g | — | — | — | 29 | 34.9 | 29 |
| Hexene | ml | — | — | — | 13 | 0 | 13 |
| Hydrogen | molppm in ethylene feed | — | — | — | 0 | 0 | 0 |
| Fraction polymer stage 2 | w % | 0 | 0 | 0 | 100 | 100 | 100 |
| Time | min | 40 | 0 | 0 | 60 | 87 | 50 |
| TOTAL | | | | | | | |
| Total time | min | 40 | 40 | 60 | 87 | | 50 |
| H2 in headspace, final | molppm | — | 12000 | — | — | | — |
| Polymer weight | g | 134 | 241 | 323 | 349 | 404 | 590 |
| Productivity | g/g | 638 | 678 | 1068 | 1798 | 378 | 2153 |

TABLE 3-continued

POLYMER ANALYSES

| | | | | | | |
|---|---|---|---|---|---|---|
| Bulk density | g/l | | 440 | 492 | 406 | — | 471 |
| Powder fraction <100 micron | w % | — | — | — | — | — |
| Powder fraction <250 micron | w % | — | — | — | — | — |
| MFR2 | g/10 min | 62 | 0.22 | 8.2 | 0.19 | 0.06 | 0.06 |
| MFR5 | g/10 min | 170 | — | 23.6 | 0.51 | 6.2 | 0.27 |
| MFR21 | g/10 min | 1040 | 16 | 255 | 3.4 | 16 | 2.4 |
| Density | g/l | 967 | 949 | 968 | 930 | 953 | 932 |
| Mn (GPC) | g/mol | 5000 | 17000 | 6000 | 79000 | 21000 | 43000 |
| Mw (GPC) | g/mol | 50000 | 280000 | 175000 | 22000 | 350000 | 290000 |
| Peak MW (GPC) | g/mol | 30000 | 62000 | — | 195000 | 75000 | 165000 |
| Haul-off (1 m/min) | g | — | 3.91 | — | — | — | — |
| Eta 0 05 s-1 | Ns/m2 | — | 48217 | — | — | 153680 | — |

| | | | | | | |
|---|---|---|---|---|---|---|
| Pol no | | 8 | 10 | "8" | 7 | 9 |
| Poltest no. | | 30192 | 30195 | 11636 | 30188 | 30193 |
| Cat-type | | z | z | z1 | y | z |
| Cat identity | | | | | | |
| Column no in table 1 in filing December 98 | | 5 | 6 | | 7 | 8 |
| | | | | Both | | Both stages, reversed H2 order |
| Cat name in filing December 98 | | z | z | | y | z |
| Invention Reference | | Invent | Invent | Invent | Ref | Invent |
| Catalyst weight | g | 0.238 | 0.250 | 0.454 | 0.273 | 0.264 |
| STAGE 1 | | Yes | Yes | Yes | Yes | Yes |
| Temperature | C. | 95 | 95 | 90 | 85 | 85 |
| Pressure | bar g | 32 | 32 | 30.5 | 29 | 29 |
| Hexene | ml | 0 | 0 | 0 | 0 | 13 |
| Hydrogen | molppm in ethylene feed | 2000 | 2000 | 2000 | 2000 | 0 |
| Time | min | 40 | 40 | 77 | 36 | 30 |
| STAGE 2 | | Yes | Yes | Yes | Yes | Yes |
| Temperature | C. | 85 | 85 | 90 | 85 | 85 |
| Pressure | bar g | 29 | 29 | 30.5 | 29 | 32 |
| Hexene | ml | 13 | 0 | 0 | 13 | 0 |
| Hydrogen | molppm in ethylene feed | 0 | 0 | 0 | 0 | 2000 |
| Fraction polymer stage 2 | w % | 50 | 25 | 23 | 46 | 54 |
| Time | min | 33 | 10 | 23 | 36 | 40 |
| TOTAL | | | | | | |
| Total time | min | 73 | 50 | 100 | 71 | 70 |
| H2 in headspace, final | molppm | — | — | — | — | — |
| Polymer weight | g | 670 | 362 | 240 | 575 | 821 |
| Productivity | g/g | 2395 | 1448 | 529 | 2106 | 3109 |
| POLYMER ANALYSES | | | | | | |
| Bulk density | g/l | 487 | 472 | | 381 | 468 |
| Powder fraction <100 micron | w % | — | — | 0.1 | 0.5 | — |
| Powder fraction <250 micron | w % | — | — | 2.4 | 5.4 | — |
| MFR2 | g/10 min | 0.12 | 0.22 | 1.6 | 1.2 | 0.17 |
| MFR5 | g/10 min | 0.5 | 0.83 | 6.1 | — | — |
| MFR21 | g/10 min | 6.5 | 16.5 | 74 | 50 | 7.7 |
| Density | g/l | 940.6 | 954.1 | 960.9 | 950 | 945 |
| Mn (GPC) | g/mol | 16000 | 12000 | — | 21000 | 18000 |
| Mw (GPC) | g/mol | 275000 | 285000 | — | 135000 | 280000 |
| Peak MW (GPC) | g/mol | 20000/ 150000 | 25000/ 170000 | — | | 16000/ 20000 |
| Haul-off (1 m/min) | g | 7.66 | 6.36 | 1.75 | 0.77 | 5.88 |
| Eta 0 05 s-1 | Ns/m2 | 68291 | 52796 | 14865 | 6006 | 43839 |

TABLE 3-continued

| Pol no | | | | | |
|---|---|---|---|---|---|
| Poltest no. | | 20863 | 20842 | 300197 | 70087 |
| Cat-type | | T | T | y1 | y1 |
| Cat identity | | | | | |
| Column no in table 1 in filing December 98 | | | | | |
| | | Stage one only | Stage two only | Stage one only | Stage two only |
| Cat name in filing December 98 | | | | | y |
| Invention Reference | | Ref | Ref | Invent | Invent |
| Catalyst weight | g | 0.102 | 0.098 | 0.128 | 0.152 |
| STAGE 1 | | Yes | Omit | Yes | Omit |
| Temperature | C. | 85 | — | 95 | — |
| Pressure | bar g | 29 | — | 32 | — |
| Hexene | ml | 0 | — | 0 | — |
| Hydrogen | molppm in ethylene feed | 2350 | — | 2000 | — |
| Time | min | 55 | 0 | 40 | 0 |
| STAGE 2 | | Omit | Yes | Omit | Yes |
| Temperature | C. | — | 85 | — | 85 |
| Pressure | bar g | — | 29 | — | 29 |
| Hexene | ml | — | 0 | — | 0 |
| Hydrogen | molppm in ethylene feed | — | 0 | — | 0 |
| Fraction polymer stage 2 | w % | 0 | 100 | 0 | 100 |
| Time | min | 0 | 60 | 0 | 90 |
| TOTAL | | | | | |
| Total time | min | 85 | 60 | 40 | 90 |
| H2 in headspace, final | molppm | 1900 | — | — | — |
| Polymer weight | g | 116 | 133 | 61 | 386 |
| Productivity | g/g | 1137 | 1357 | 478 | 2400 |
| POLYMER ANALYSES | | | | | |
| Bulk density | g/l | | | — | 377 |
| Powder fraction <100 micron | w % | — | — | — | — |
| Powder fraction <250 micron | w % | — | — | — | — |
| MFR2 | g/10 min | — | — | 70 | 0.11 |
| MFR5 | g/10 min | 0.2 | — | — | 0.20 |
| MFR21 | g/10 min | 4.7 | — | — | 1.7 |
| Density | g/l | 943 | 925 | — | 938 |
| Mn (GPC) | g/mol | 9000 | 190000 | — | — |
| Mw (GPC) | g/mol | 210000 | 630000 | — | — |
| Peak MW (GPC) | g/mol | 110000 | 400000 | — | — |
| Haul-off (1 m/min) | g | — | — | — | — |
| Eta 0 05 s-1 | Ns/m2 | — | — | — | — |

Figure 3:
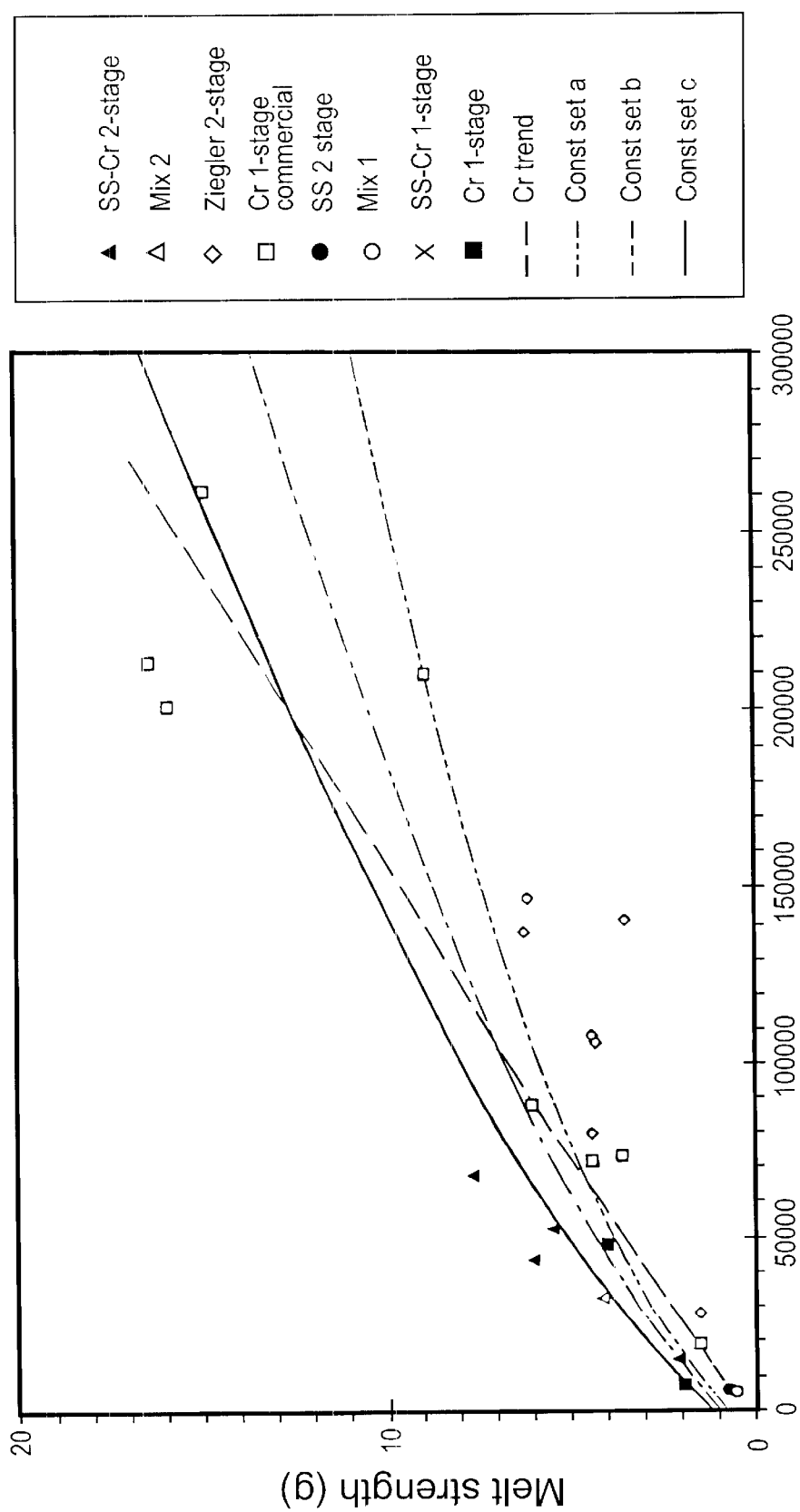
FIG. 3 is a graph showing melt strength plotted against viscosity comparing 2-stage metallocene polymers to those of the present invention.
Figure 4:
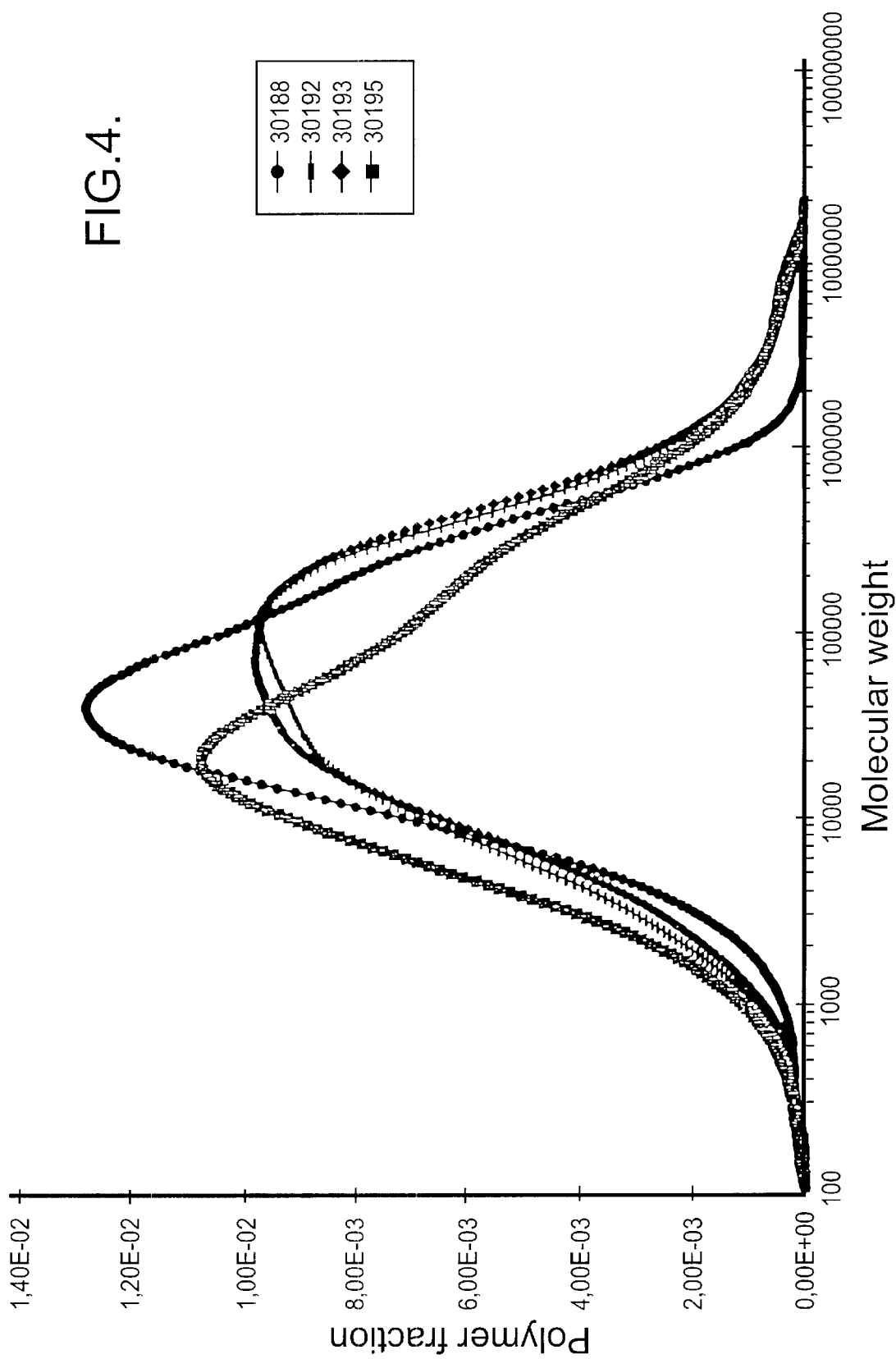
FIG. 4 is a GPC curve/molecular weight distribution curve for runs 30188, 30192, 30193 and 30195. The X axis shows the molecular weight, the Y axis simply shows polymer fraction and is in entirely arbitrary units.
Figure 5:
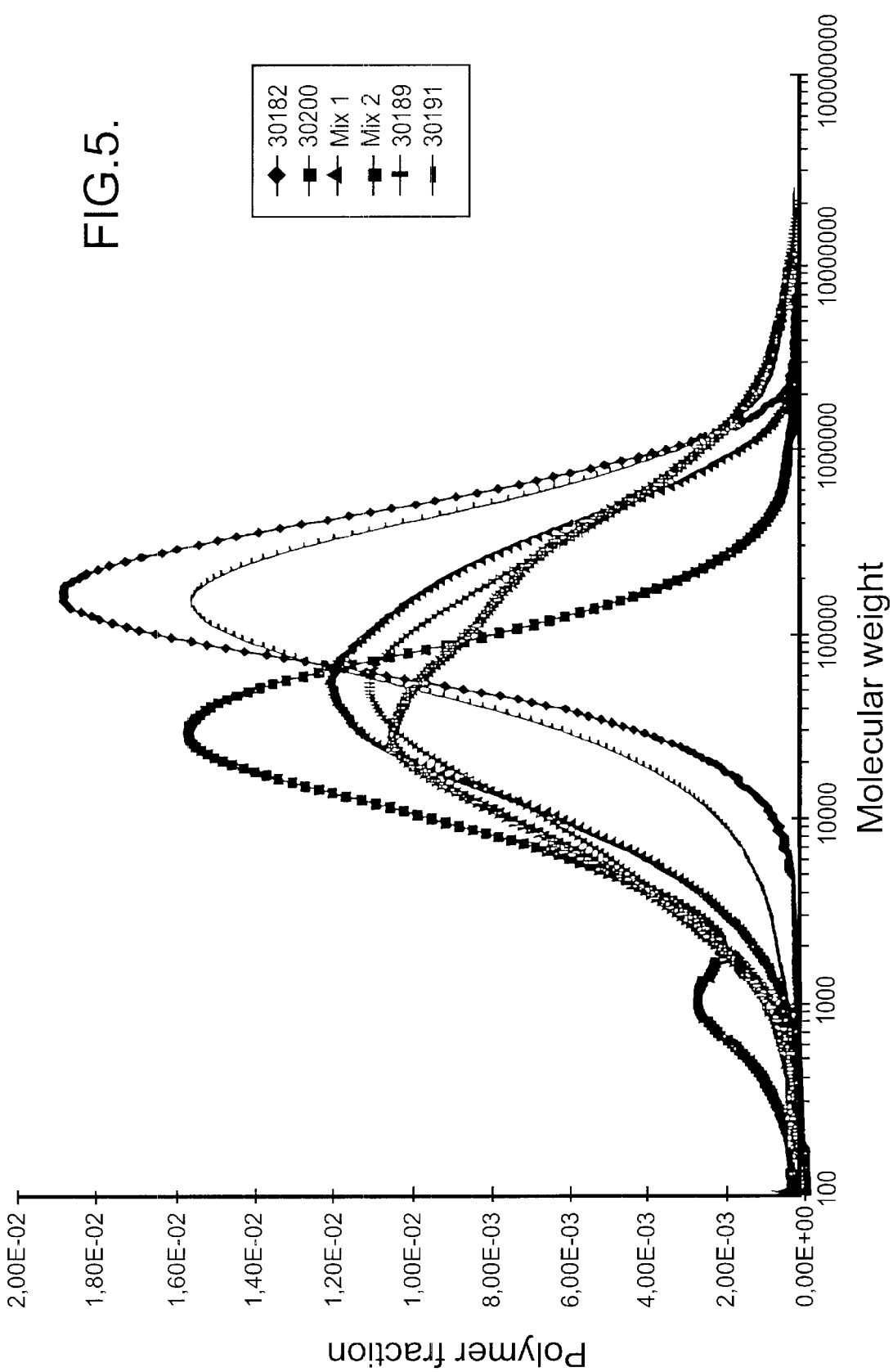
FIG. 5 is also a GPC curve for the listed runs with the same axes.

When 2-stage metallocene polymers are compared with the invention, it may be seen that the invention polymers have the advantage of a much higher melt strength (graph "melt strength vs viscosity"—FIG. 3). Such advantage enables the use of the invention polymer for much larger pieces of blow moulding than 2-stage metallocene polymers.

Furthermore, it can be seen from the graph that the invention polymers have much higher melt strength also than what to our knowledge are commercial Ziegler 2-stage/multistage grades. These Ziegler grades even include two grades for use for HMW (high molecular weight) blow moulding application, an application which has very strict requirements for high melt strength. So also vs these grades, the invention polymers are advantageous.

It is seen that the polymers made by the invention have much higher melt strength at similar polymer melt viscosity than the two-stage polymers made by metallocene catalyst or made by Ziegler catalyst. This shows an astonishing synergy: A high melt strength polymer is mixed with low melt strength polymer without resulting in lowered melt strength, it even seems to increase it. This is all the more remarkable since it is believed that the polymers exemplified contain only a small fraction of the high melt strength component.

Though the melt strength of the invention polymers may not be much higher than pure chromium polymers, a pure chromium catalyst cannot be used to produce bimodal molecular weight polymers (as evidenced by comparing run 11620 with 30189) that can be made with metallocene or Ziegler catalyst.

Ziegler based bimodal polymers constitute a large part of the world production of HDPE today. Compared with the production of chromium oxide monomodal (single reactor made) polymers, the bimodal polymers that are made using processes with two polymerization reactors or more, gives the advantageous flexibility for the polymer producer to control the incorporation of comonomer much better than in the chromium oxide case.

On the other hand, metallocene and Ziegler based bimodal polymers are poor in applications where very high melt strength is needed, like in HMW blow moulding.

By this invention, in run 30192 is added hexene in the second stage, in run 30193 is added hexene in the first stage, both giving reduced density compared to run 30195 where no comonomer was added. Of course, other amounts of comonomer could have been used to control the polymer composition. So there is good flexibility to control the incorporation of comonomer well using this invention. So the polymers of this invention are both bimodal, can have tailor-made comonomer incorporation, and have high melt strength, a combination of properties neither the bimodal polymers from the staged processes have, nor the single reactor chromium oxide based polymers have.

The metallocene-chromium oxide catalyst used in run 11636 has a slightly smaller average particle size than the pure metallocene catalyst 30188. Still, run 11636 gives several times lower amount of fines than run 30188 gives. It is important to keep the level of polymer fines low in commercial polymerization production, as fines are difficult to separate from gases and liquids through the process.

The observed difference in fines between run 11636 and 30188 shows that the metallocene-chromium oxide catalyst must be more resistant to attrition than the powder from the pure metallocene catalyst. This is unexpected and certainly valuable.

Bimodal polymer compositions were made in bench scale by mixing together polymers made with the same kind of catalyst, but having been produced by low and high hydrogen concentration in one stage polymerizations. The polymers were mixed as powder in the given ratios and then extruded as described earlier. The extruded granulate was subjected to microscopy as described earlier.

From GPC and MFR data were estimated the probable composition (fraction of Cr oxide polymer) of the samples.

So these mixed samples should have the same composition as could be made by staged polymerization with the same catalyst. However, the distribution of the polymer fraction made in the high hydrogen stage within the mixed sample powder particles prior to extrusion would be different, since the chromium oxide polymer component fraction would exclusively be present as separate particles.

It should be understood that also in a continuous polymerization process consisting of mixed, staged reactors, statistically there would be some particles that consists almost entirely of polymer from the high hydrogen reactor (s). Correspondingly, in such a process, there would also be some particles that consist almost entirely of polymer made in low hydrogen reactor(s) So the mixed powder samples have, regarding inhomogeneity, a lot in common with the polymer powder coming from the last polymerization reactor in a continuous process. Sometimes polymer gels in the final extruded polymer from such processes turn up, gels originating from those almost pure low hydrogen reactor particles (high molecular weight particles).

The microscopy analysis revealed that the extruded polymer made by the metallocene-chromium oxide had six times lower gels content than the metallocene polymer and none of the especially disagreeable large gels. This in spite of the overall composition being "equivalent" in the way that both mixes had the same fraction of LMW polymer (defined as the polymer made by the metallocene sites in the high hydrogen reactor), and had the same processability as evidenced by the same $\eta_{300}$ of the two polymers. So the metallocene-chromium catalyst in staged operation even fulfills this third unexpected advantage: Provides a more easily homogenized polymer with a lower amount of gels.

What is claimed is:

1. A process for the preparation of an olefin polymer, said process comprising polymerising at least one olefin in the presence of an olefin polymerisation multisite catalyst in two reaction stages, hydrogen being present at a higher concentration in one reaction stage and a lower concentration in the other reaction stage, said olefin polymerisation multisite catalyst having:
   (I) a metallocene catalytic site A capable of producing a different polymer component at said higher and lower hydrogen concentrations, the $MFR_2$ of the polymer produced during the higher hydrogen concentration reaction stage being 100 to 2000; and
   (II) a catalytic site B capable of producing a different polymer component at said higher and lower hydrogen concentrations;
   such that the ratio of the $MFR_2$ of the polymer components produced by catalytic site A is at least 50 and the ratio of the $MFR_2$ of the polymer components produced by catalytic site B is less than 10.

2. A process as claimed in claim 1 wherein the ratio between $MFR_2$ or $MFR_{21}$ of polymers produced by site B at two different selected hydrogen concentrations is less than 5.

3. A process as claimed in claim 2 wherein the ratio between $MFR_2$ or $MFR_{21}$ of polymers produced by site B at two different selected hydrogen concentrations is less than 2.

4. A process as claimed in claim 1 wherein the ratio between $MFR_2$ or $MFR_{21}$ of the polymers produced by site A at two different hydrogen concentrations is more than 100.

5. A process as claimed in claim 4 wherein the ratio between $MFR_2$ or $MFR_{21}$ of polymers produced by site A at two different hydrogen concentrations is more than 1000.

6. A process as claimed in claim 1 wherein the low MW component produced by site A is produced in the first reaction stage.

7. A process as claimed in claim 1 wherein the major part of the polymer composition is prepared by Site A.

8. A process as claimed in claim 1 wherein Site B makes a high MW fraction.

9. A process as claimed in claim 1 involving at least two reactors.

10. A process as claimed in claim 1 wherein no one of the reaction stages is used to produce more than 70% of the overall polymer.

11. A process as claimed in claim 1 wherein the dual site catalyst comprises a metallocene site and a chromium oxide site.

12. A process as claimed in claim 11 wherein said metallocene site comprises hafnium.

13. A process as claimed in claim 1 wherein said dual site catalyst is present on a single support.

14. A high melt strength polymer obtained by a process as described in claim 1.

15. A polyolefin obtained by the process described in claim 1 and which has a melt strength which satisfies the equation:

$$HO = A*(B+\eta_{0.05})^D - C,$$

when HO is the haul off value (melt strength) in g, $\eta_{0.05}$ is the melt viscosity (Ns/m2) at a shear rate of 0.05 s$^{-1}$, A=0.005, B=25000, C=2.4 and D=0.65 and that comprises a low MW component and a high molecular weight component, the low MW component constituting 20 to 80 wt % of the total polymer having a Mw/Mn of less than 10; and the high MW component constituting 15 to 75 wt % and having a Mw/Mn of less than 10; and the ratio of peak MW of the High MW component over that of the low MW component is above 2.

* * * * *